US012811789B2

(12) United States Patent
Spires et al.

(10) Patent No.: US 12,811,789 B2
(45) Date of Patent: Nov. 24, 2026

(54) CONTEXTUAL CHAT REPLIES

(71) Applicant: Snap Inc., Santa Monica, CA (US)

(72) Inventors: Wade Spires, Santa Monica, CA (US); Kent Tam, Los Angeles, CA (US); Susan Marie Territo, Los Angeles, CA (US); Jeremy Voss, Los Angeles, CA (US); David Whyte, Toronto (CA); Xuezi Zhang, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 135 days.

(21) Appl. No.: 18/738,810

(22) Filed: Jun. 10, 2024

(65) Prior Publication Data

US 2024/0333507 A1 Oct. 3, 2024

Related U.S. Application Data

(63) Continuation of application No. 17/563,820, filed on Dec. 28, 2021, now abandoned.

(51) Int. Cl.
*H04L 9/32* (2006.01)
*H04L 9/00* (2022.01)

(52) U.S. Cl.
CPC .............. *H04L 9/3213* (2013.01); *H04L 9/50* (2022.05)

(58) Field of Classification Search
CPC ........................... G06F 3/04886; G06F 3/0482
See application file for complete search history.

(56) References Cited

U.S. PATENT DOCUMENTS 9,805,340 B2 * 10/2017 Chaar ................... G06F 3/0482
11,308,185 B1 4/2022 Paczkowski et al.
2016/0364368 A1 * 12/2016 Chen .................... G06Q 10/107
2017/0289086 A1 * 10/2017 Grotto ................... H04L 51/216
2017/0353416 A1 12/2017 Brooks et al.
2018/0159812 A1 * 6/2018 Sarafa ................... H04L 51/066
2019/0220823 A1 7/2019 Sutedja et al.

(Continued)

FOREIGN PATENT DOCUMENTS

WO WO-2023129931 A1 7/2023

OTHER PUBLICATIONS

"U.S. Appl. No. 17/563,820, Non Final Office Action mailed Feb. 14, 2024", 12 pgs.

(Continued)

*Primary Examiner* — Vu V Tran

(74) *Attorney, Agent, or Firm* — Schwegman Lundberg & Woessner, P.A.

(57) ABSTRACT

A system to perform operations that include: causing display of a messaging interface at that comprises a plurality of messages; receiving an input that selects a message from among the plurality of messages, the message corresponding with a sender identifier; causing display of a menu element responsive to the input that selects the message, the menu element comprising a display of the message and a set of composition options; receiving a selection of a composition option from among the set of composition options; causing display of a text input field based on the selection of the composition option; receiving a text input via the text input field; and causing display of a quoted reply within the messaging interface, the quoted reply comprising at least the text input, the message, the sender identifier, and a user identifier associated with the user account.

20 Claims, 13 Drawing Sheets

(56) References Cited

U.S. PATENT DOCUMENTS

| | | | |
|---|---|---|---|
| 2020/0005284 A1 | 1/2020 | Vijayan | |
| 2021/0203860 A1 | 7/2021 | Voss et al. | |
| 2022/0343705 A1* | 10/2022 | Verma | G07C 9/00309 |
| 2023/0208641 A1 | 6/2023 | Spires et al. | |
| 2024/0037256 A1 | 2/2024 | Lyren | |

OTHER PUBLICATIONS

"U.S. Appl. No. 17/563,820, Response filed Mar. 29, 2024 to Non Final Office Action mailed Feb. 14, 2024", 9 pgs.
"International Application Serial No. PCT/US2022/082434, International Search Report mailed May 4, 2023", 4 pgs.
"International Application Serial No. PCT/US2022/082434, Written Opinion mailed May 4, 2023", 9 pgs.
Hutchinson, Andrew, "Facebook Adds New Replies Option to Clarify Messenger Streams", Social Media Today, [Online] Retrieved from the Internet: <URL: https://www.socialmediatoday.com/news/facebook-adds-new-replies-option-to-clarify-messenger-streams/550952/>, (Mar. 21, 2019), 3 pgs.
"International Application Serial No. PCT/US2022/082434, International Preliminary Report on Patentability mailed Jul. 11, 2024", 11 pgs.
U.S. Appl. No. 17/563,820, filed Dec. 2, 20218, Contextual Chat Replies.
"Korean Application Serial No. 10-2024-7025044, Notice of Preliminary Rejection mailed Jun. 11, 2026", w/ English translation, 8 pgs.

* cited by examiner

CONTEXTUAL CHAT REPLIES

CROSS-REFERENCE TO RELATED APPLICATION

This application is a continuation of U.S. patent application Ser. No. 17/563,820, filed Dec. 28, 2021, which is incorporated by reference herein in its entirety.

BACKGROUND

The explosive growth of digital communications media has supplemented conventional forms of communication. Today, people most often communicate with one other in online environments by sending and receiving messages in various social networking platforms, and messaging applications. Using these systems, users can communicate with other users by sending messages within chat/messaging sessions, wherein multiple users may often be engaged in a single messaging session. When large numbers of messages are involved, whether it be in a social networking system or otherwise, it is easy for a user to become overwhelmed with a constant stream of incoming messages. Thus, it has become a challenge to organize and present messages to users in a manner that is both efficient and user-friendly.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
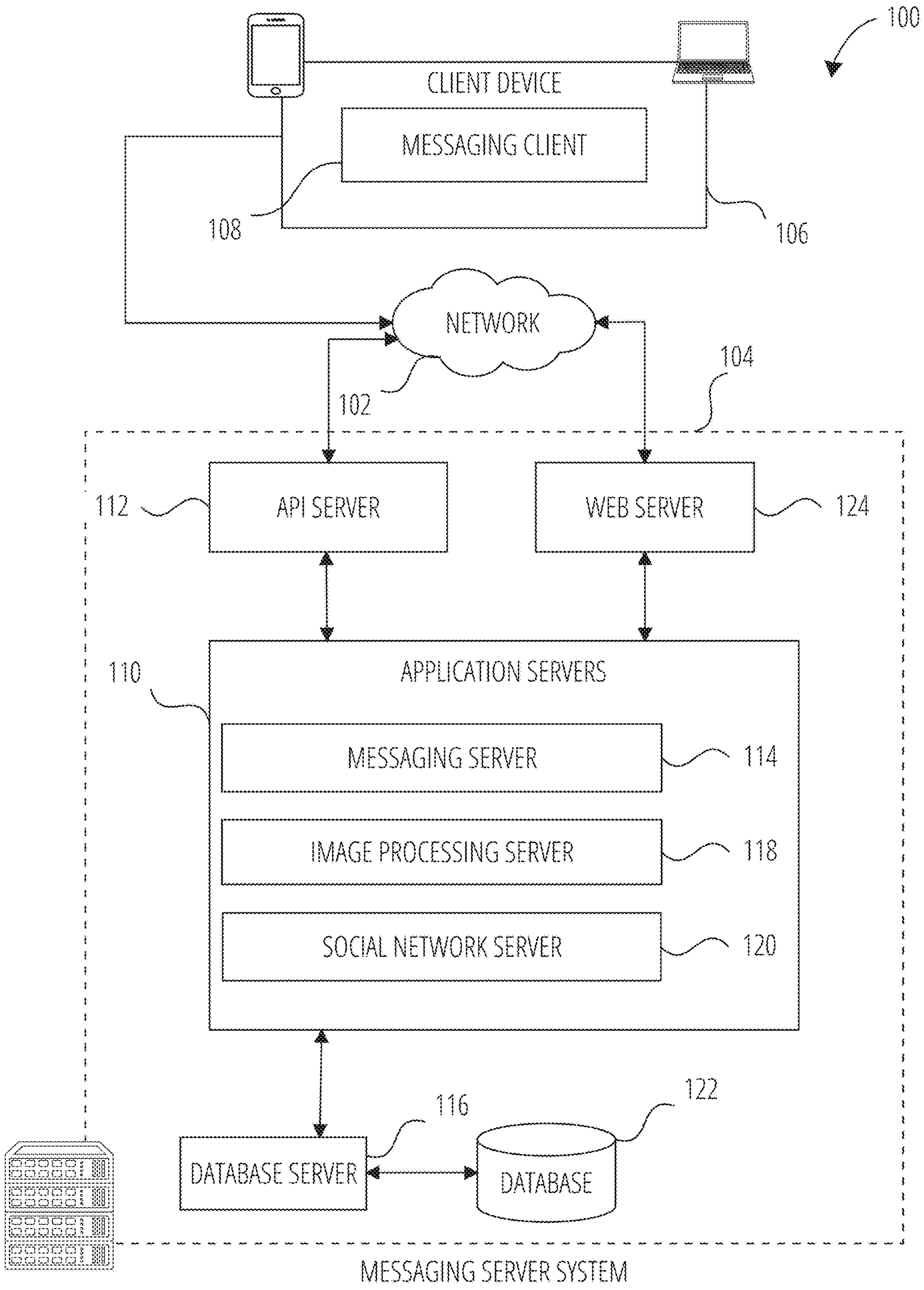
FIG. 1 is a diagrammatic representation of a networked environment in which the present disclosure may be deployed, in accordance with some examples.

As discussed above, modern social networking and communication platforms enable individuals to engage in communication sessions with a plurality of users, such that the users may send and receive messages within a common messaging interface. While such systems provide a number of benefits, and facilitate quick and convenient communication, a drawback is high volumes of messages which often become difficult to keep up with. As a result, messages are often sent or received with very little context. The disclosed system seeks to provide a solution to the above-mentioned problem, wherein users may provide responses to individual messages sent within a communication session, such that the responses may be displayed with necessary contextual information.

Disclosed system provides systems and methods for generating and displaying contextual responses to messages sent within a messaging session. According to certain example embodiments, a contextual reply system may perform operations that comprise: causing display of a messaging interface at a client device associated with a user account, the messaging interface comprising a plurality of messages; receiving an input that selects a message from among the plurality of messages, the message corresponding with a sender identifier; causing display of a menu element responsive to the input that selects the message, the menu element comprising a display of the message and a set of composition options; receiving a selection of a composition option from among the set of composition options; causing display of a text input field based on the selection of the composition option, the text input field comprising a presentation of the message that includes the sender identifier; receiving a text input via the text input field; and causing display of a quoted reply within the messaging interface, the quoted reply comprising at least the text input, the message, the sender identifier, and a user identifier associated with the user account.

According to certain example embodiments, the sender identifier may include one or more of: a username; a user icon, such as an emoji; and a color or pattern associated with a user identified by the sender identifier within the messaging session. Accordingly, the quoted reply displayed by the contextual reply system may be generated such that one or more graphical properties of the quoted reply are based on the sender identifier. For example, the quoted reply may be displayed with a border element, wherein the border element is in a color or pattern based on the sender identifier.

In some embodiments, the contextual reply system may cause display of the menu element that comprises the set of composition options based on an attribute of the input that selects the message from among the plurality of messages. Input attributes may include one or more of: an input pressure; an input duration; and an input gesture. For example, a user of the contextual reply system may provide an input wherein the input comprises a swipe gesture. Responsive to receiving the input that comprises the swipe gesture that selects the message from among the plurality of messages, the contextual reply system may cause display of the menu element that comprises the set of composition options.

In some embodiments, the presentation of the quoted reply may be comprise a hyperlink that points to a position of the original message selected by the user within the plurality of messages. For example, a user may select the quoted reply, and in response, the contextual reply system may determine a location of the original message among a plurality of messages, and cause display of the plurality of messages within the messaging interface based on the location. By doing so, a user may be presented with additional contextual information surrounding the quoted reply.

In some embodiments, the plurality of messages may include ephemeral messages, wherein the ephemeral message comprise a display duration. For example, upon receiving a message, the message may be presented to the users engaged in the communication session for a period of time based on the display duration of the message. In some embodiments, a display of the message within a quoted reply may depend on a display state of the message among the plurality of messages. For example, in some embodiments, the contextual reply system may present the message within the quoted reply until the display duration of the message expires. In some embodiments, the display of the message within the quoted reply may be based on the display state of the message at the time in which a user generates the quoted reply.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
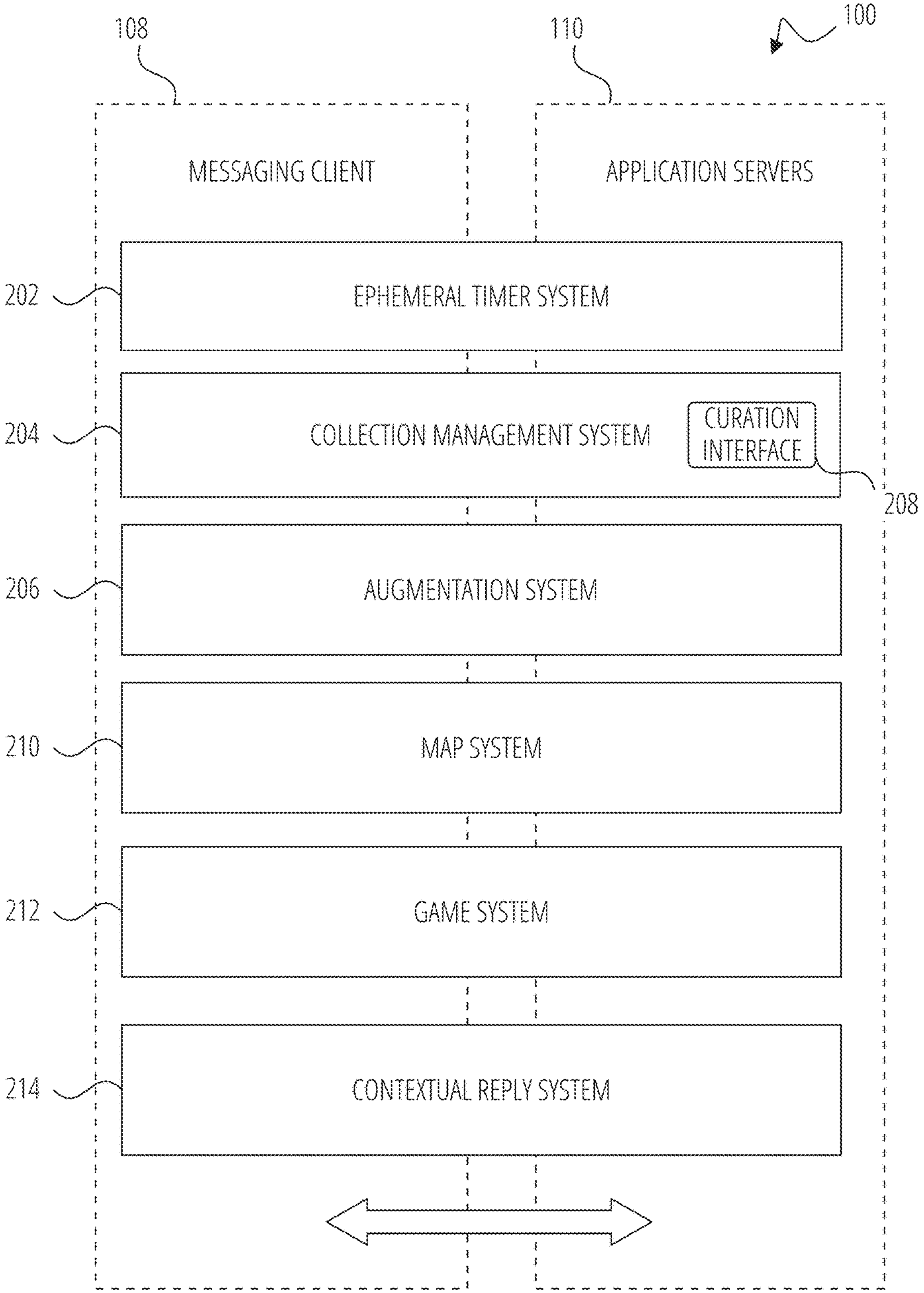
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a contextual reply system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars (e.g., stored in profile data 316 (deleted)) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The contextual reply system 214 provides functions related to generating and displaying a quoted reply based on a selection of a message from among a plurality of messages, according to certain example embodiments.

Figure 3:
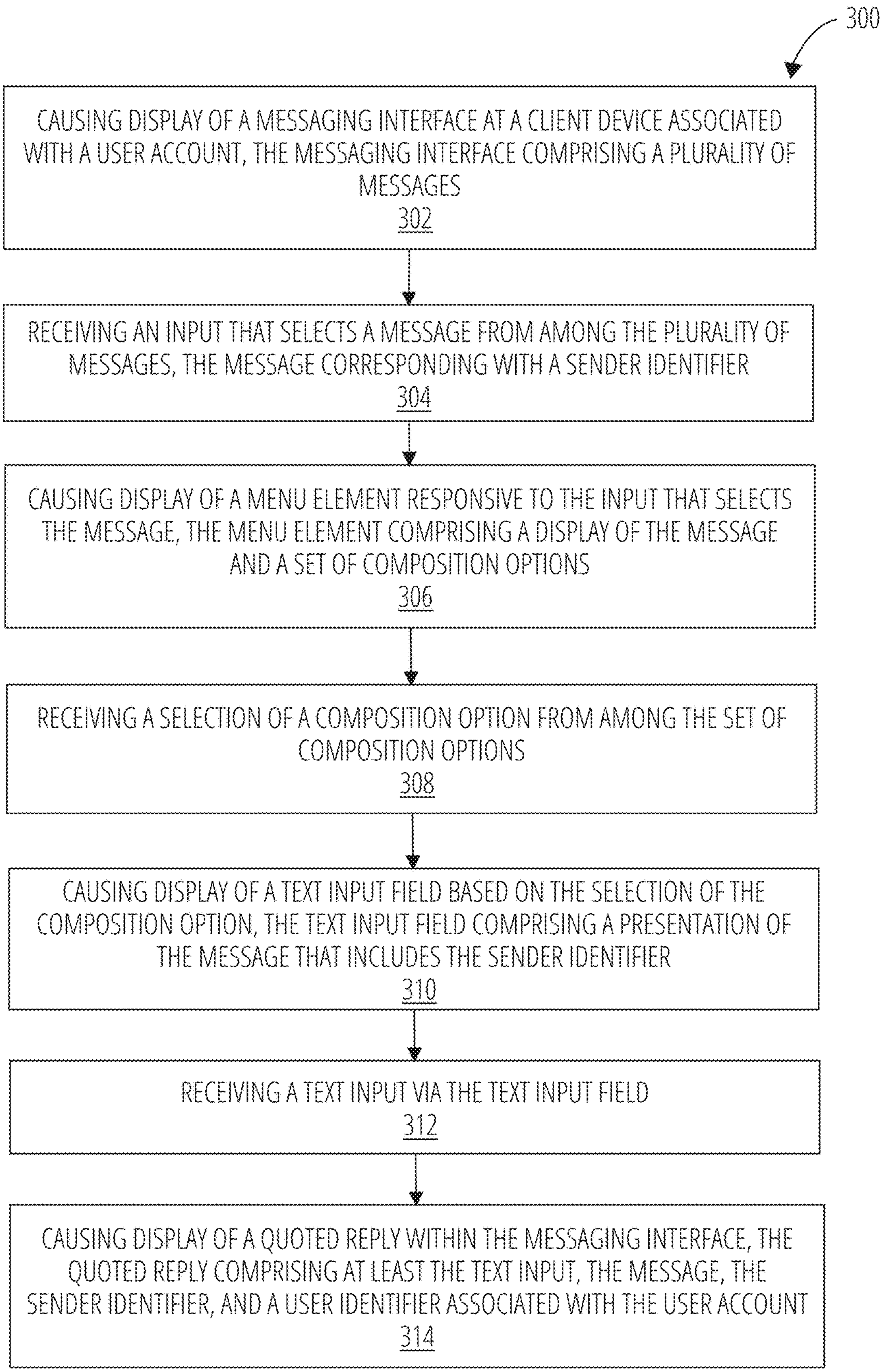
FIG. 3 is a flowchart depicting a method 300 for generating a quoted reply, in accordance with one embodiment.

FIG. 3 is a flowchart illustrating operations of a contextual reply system 214 in performing a method 300 for generating a quoted reply, in accordance with one embodiment. Operations of the method 300 may be performed by one or more subsystems of the messaging system 100 described above with respect to FIG. 2, such as the contextual reply system 214. As shown in FIG. 3, the method 300 includes one or more operations, 302, 304, 306, 308, 310, 312, and 314.

At operation 302, the contextual reply system 214 causes display of a messaging interface at a client device 106, wherein the client device 106 is associated with a user account, and wherein the messaging interface comprises a plurality of messages.

At operation 304, the contextual reply system 214 receives an input that selects a message from among the plurality of messages, wherein the message comprises a sender identifier that identifies a user that sent the message.

At operation 306, the contextual reply system 214 presents a menu element responsive to the input that selects the message, wherein the menu element comprises a display of the message and a set of composition options.

At operation 308, a user of the client device 106 provides a selection of a composition option from among the set of composition option. In some embodiments, the selection of the composition option may be based on an input attribute of the input that selects the message from among the plurality of messages. Input attributes may include one or more of: an input pressure; an input duration; and an input gesture. For example, by providing a swiping gesture upon a message presented among the plurality of messages, the contextual reply system 214 may automatically select a composition option from among a set of composition options.

At operation 310, the contextual reply system 214 presents a text input field based on the selection of the composition option, wherein the text input field comprises a display of the selected message that includes the sender identifier of a sender of the message.

At operation 312, a user of the client device 106 may thereby provide an input via the text input field, wherein the input comprises one or more of: a sequence of characters; a uniform resource locator (URL); and a media object selected from among a plurality of media objects.

At operation 314, the contextual reply system 214 generates and causes display of a quoted reply within the messaging interface, wherein the quoted reply comprises the input received via the text input field, the sender identifier of the message, and a user identifier associated with the client device 106.

Figure 4:
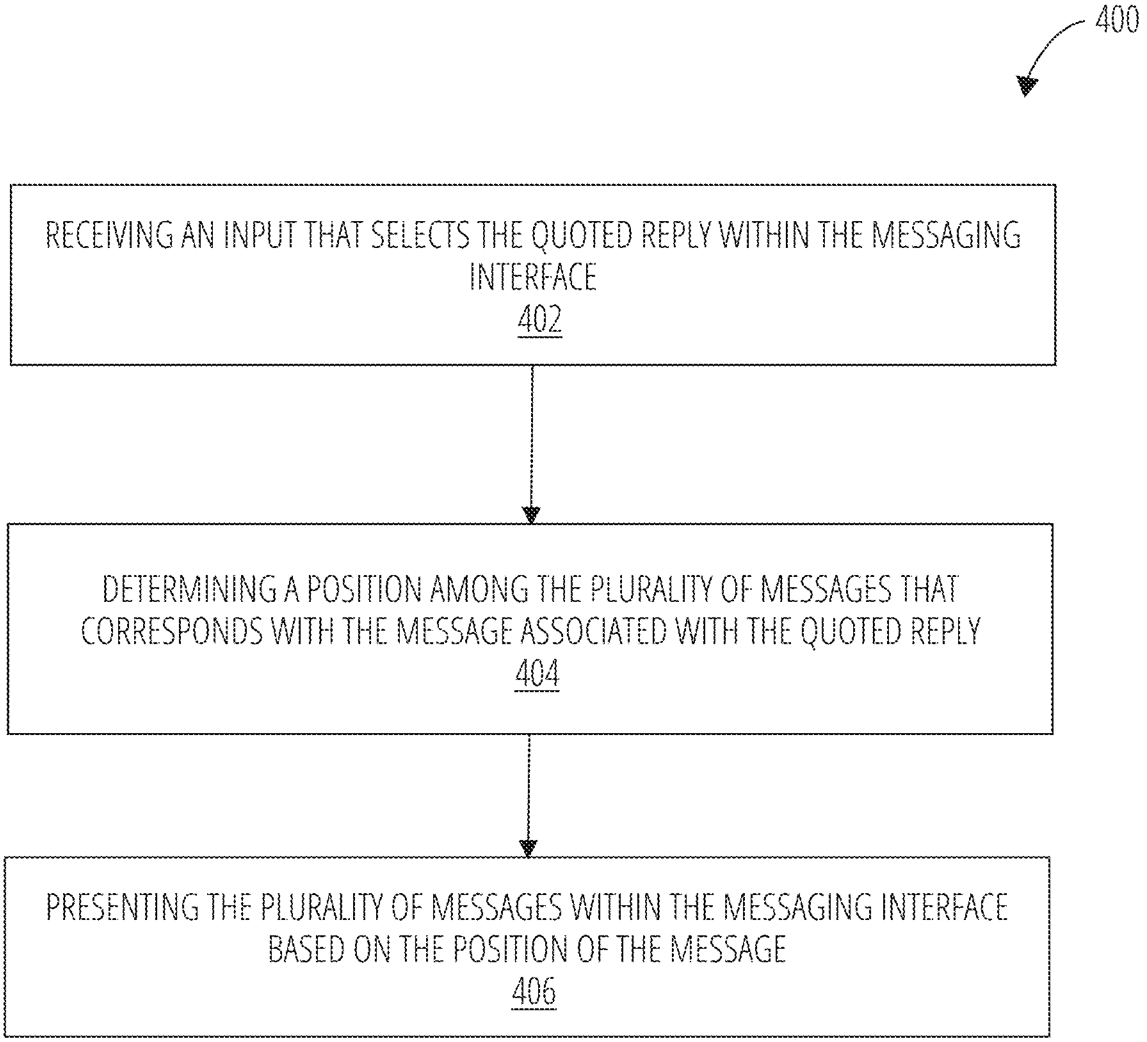
FIG. 4 is a flowchart depicting a method 400 for presenting a set of messages within a messaging interface, in accordance with one embodiment.

FIG. 4 is a flowchart illustrating operations of a contextual reply system 214 in performing a method 400 for presenting a set of messages within a messaging interface, in accordance with one embodiment. Operations of the method 400 may be performed by one or more subsystems of the messaging system 100 described above with respect to FIG. 2, such as the contextual reply system 214. As shown in FIG. 4, the method 400 includes one or more operations 402, 404, and 406 which may be performed as a subroutine of the method 300.

In some embodiments, the quoted reply may be hyperlinked to a position of a message among the plurality of messages, such that selection of the quoted reply causes the contextual reply system 214 to present the plurality of messages based on the position of the message associated with the quoted reply. For example, the contextual reply system 214 may scroll or otherwise move a presentation of the plurality of messages such that the message associated with the quoted reply is presented within the messaging interface.

At operation 402, a user of the contextual reply system 214 provides an input that selects the quoted reply. The input may include a tactile input that comprises input attributes that include one or more of: an input pressure; an input duration; and an input gesture. In some embodiments, the contextual reply system 214 may correlate one or more of the input attributes to a set of instructions that cause the contextual reply system 214 to access a hyperlink associated with the display of the quoted reply.

Responsive to receiving the input that selects the quoted reply, at operation 404, the contextual reply system 214 determines a position of the message associated with the quoted reply among the plurality of messages presented within the messaging interface. For example, in some embodiments, the messages may be sorted chronologically, such that messages with an earlier timestamp are displayed at a position preceding messages with a later timestamp. Accordingly, responsive to receiving the input that selects the quoted reply, the contextual reply system 214 identifies the chronological position of the message among the plurality of messages.

At operation 406, the contextual reply system 214 presents the plurality of messages within the messaging interface based on the identified position of the message among the plurality of messages.

Figure 5:
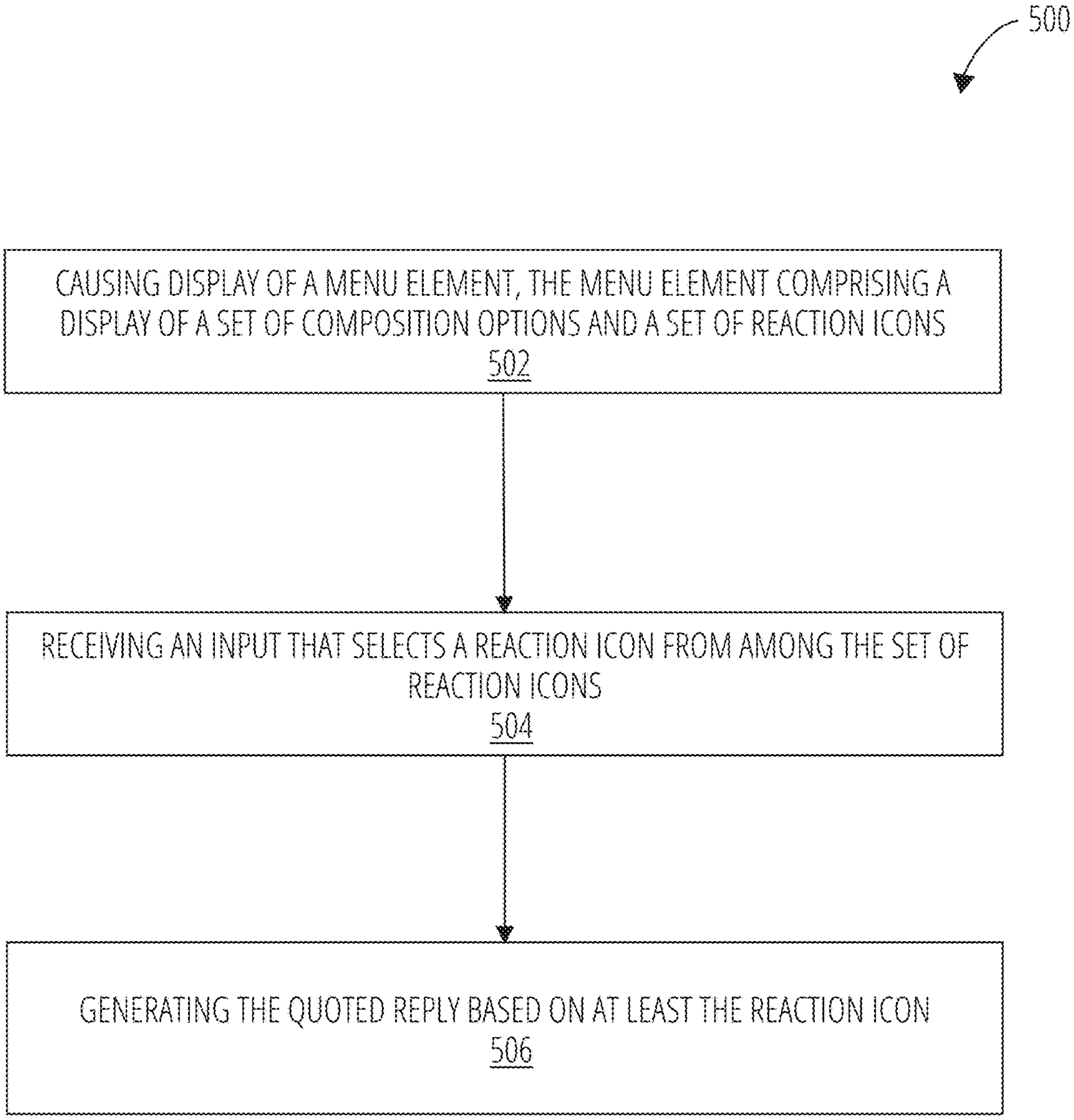
FIG. 5 is a flowchart depicting a method 500 for generating a quoted reply, in accordance with one embodiment.

FIG. 5 is a flowchart illustrating operations of a contextual reply system 214 in performing a method 500 for generating a quoted reply, in accordance with one embodiment. Operations of the method 500 may be performed by one or more subsystems of the messaging system 100 described above with respect to FIG. 2, such as the contextual reply system 214. As shown in FIG. 5, the method 500 includes one or more operations 502, 504, and 506, that may be performed as a subroutine of the method 300.

At operation 502, as in operation 306, the contextual reply system 214 presents a menu element responsive to the input that selects the message, wherein the menu element comprises a display of the message and a set of composition options. In some embodiments, the set of composition icons may include a set of reaction icons, wherein each reaction icon among the set of reaction icons comprise one or more graphical elements. In some embodiments, the reaction icons may be based on one or more user identifiers of users associated with the messaging session. For example, as seen in the interface diagram 600 of FIG. 6, the set of reaction icons may include the reaction icons 602.

At operation 504, the contextual reply system 214 receives an input that selects a reaction icon from among the set of reaction icons. Responsive to the input that selects the reaction icon from among the set of reaction icons, at operation 506 the contextual reply system 214 generates a quoted reply based on the message, wherein the quoted reply comprises a display of the message that includes the selected reaction icon.

Figure 6:
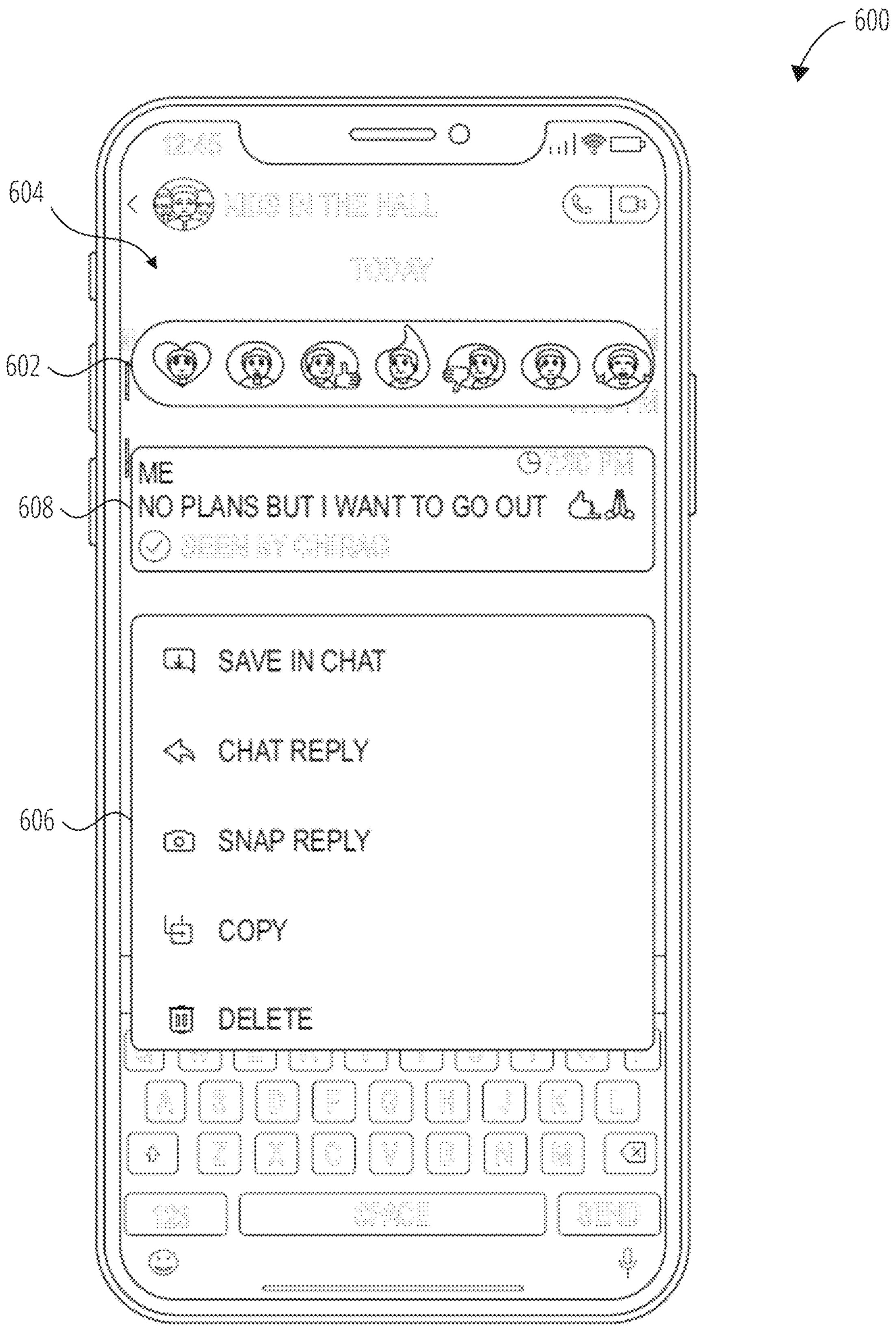
FIG. 6 is an interface diagram depicting a menu element to display a set of composition options, in accordance with one embodiment.

FIG. 6 is an interface diagram 600 depicting a menu element 604 to display a set of composition options 606, in accordance with one embodiment. As seen in the interface diagram 600, the contextual reply system 214 may present the selected message 608 at a position within the menu element 604.

Figure 7:
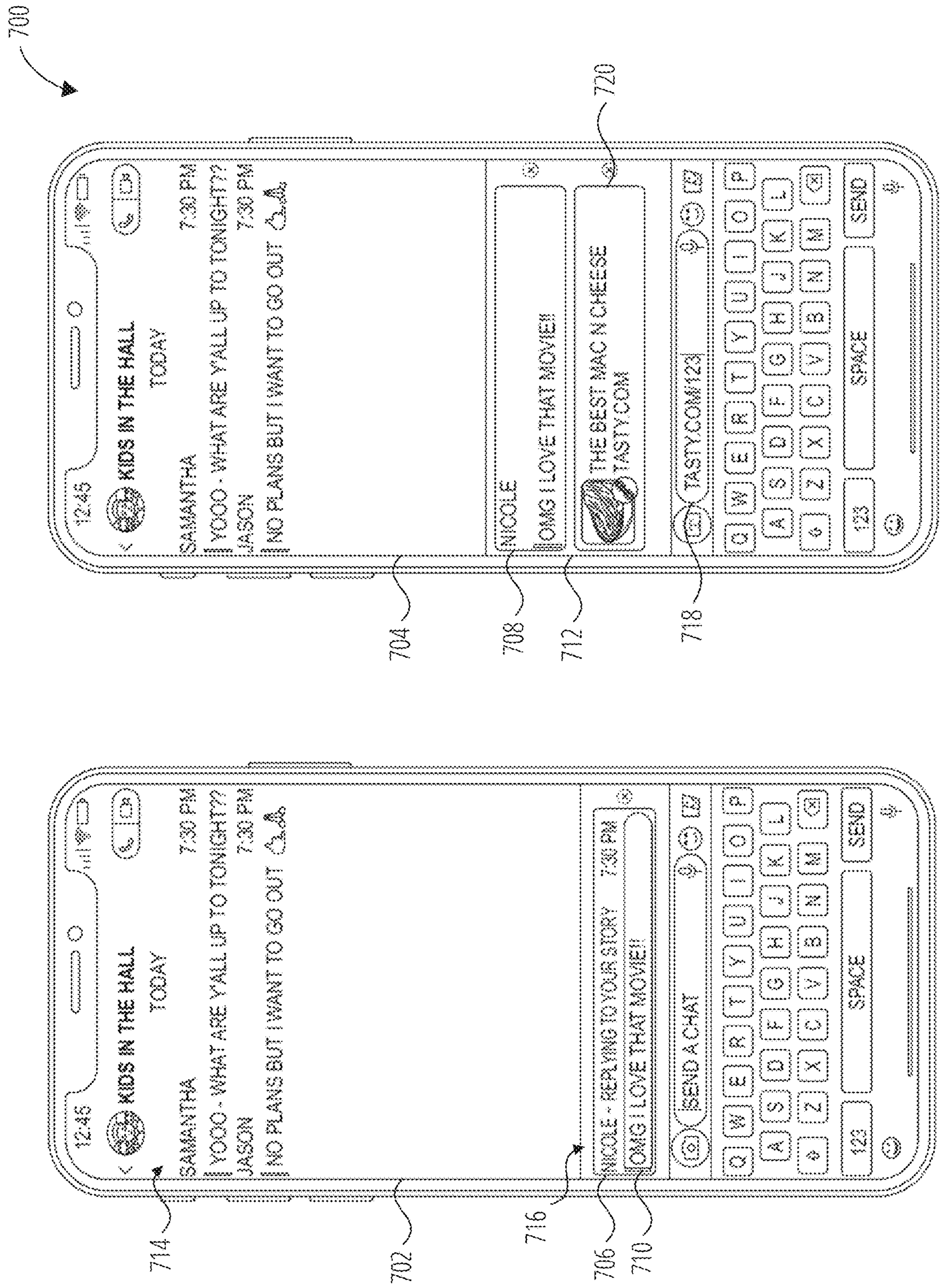
FIG. 7 is an interface flow diagram depicting interfaces presented by a contextual reply system, in accordance with one embodiment.

FIG. 7 is an interface diagram 700 depicting interfaces 702 and 704 presented by a contextual reply system, in accordance with one embodiment.

As seen in interface 702, a messaging interface presented by the contextual reply system 214 may include a display of a set of messages, such as the messages 714. Accordingly, responsive to receiving an input that selects a message from among the set of messages 714, the contextual reply system 214 may present a composition menu 716, wherein the composition menu 716 comprises a display of the selected message 710. In some embodiments, the display of the selected message 710 may include a display of contextual information 706, wherein the contextual information 706 may include a display of a sender identifier (i.e., "Nicole") as well as a timestamp (i.e., 7:30 PM), and a message context associated with the selected message 710 (i.e., "replying to your story").

In some embodiments, as seen in the interface 704, a user may respond to a message with a URL 718 by entering the URL 718 into a text input field of a composition menu presented within the interface 704. Responsive to receiving the input that includes the URL 718, the contextual reply system 214 may generate a quoted reply 712, wherein the quoted reply 712 includes a display of a selected message 708, and a hyperlink 720 based on the URL 718.

Figure 8:
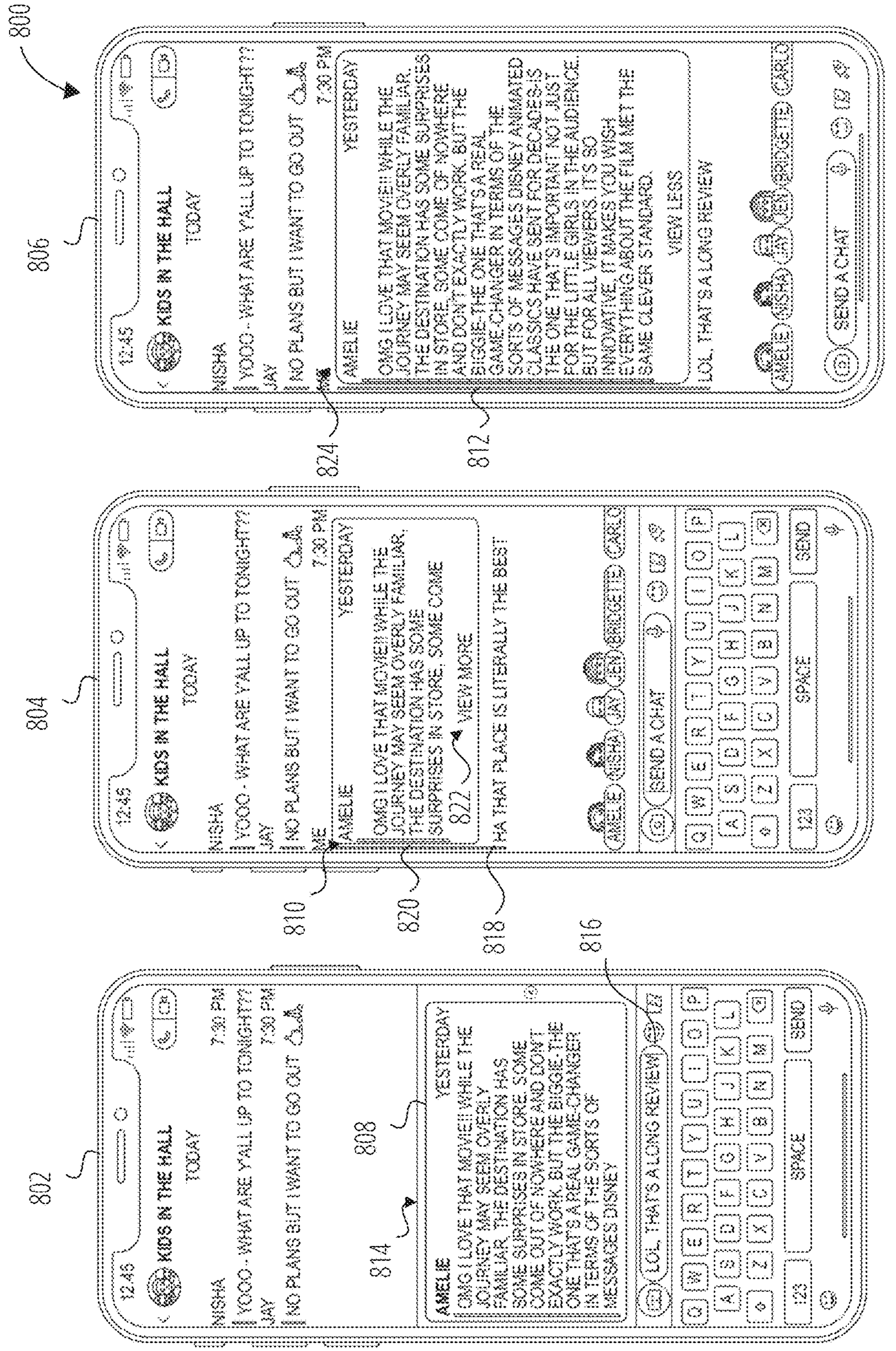
FIG. 8 is an interface diagram depicting interfaces presented by a contextual reply system, in accordance with one embodiment.

FIG. 8 is an interface diagram 800 depicting interfaces presented by a contextual reply system 214, in accordance with one embodiment. The interface diagram 800 provides an illustration of a quoted reply which may be generated and displayed by the contextual reply system 214.

As seen in the interface 802, the contextual reply system 214 may present a composition menu 814 responsive to receiving an input that selects a message from among a plurality of messages presented within the interface 802. Accordingly, the contextual reply system 214 may present the selected message 808 within the composition menu 814. A user of the contextual reply system 214 may provide an input 816 into the composition menu 814 in order to generate a quoted reply, such as the quoted reply 810 depicted in the interface 804.

As seen in the interface 804, the quoted reply 810 may comprise a display of a selected message 820, and a response 818 to the selected message message 820. In some embodiments, upon determining that the selected message 820 transgresses a threshold length (i.e., based on a number of characters, or a number of lines of text), the contextual reply system 214 may abbreviate the display of the selected message 820, and provide an icon 822, wherein selection of the icon 822 may cause the contextual reply system 214 to expand the abbreviated display of the selected message 820, as seen in the interface 806. In some embodiments, responsive to receiving an input that selects the icon 822, the contextual reply system 214 may present the expanded message 812, as seen in the quoted reply 824.

Figure 9A:
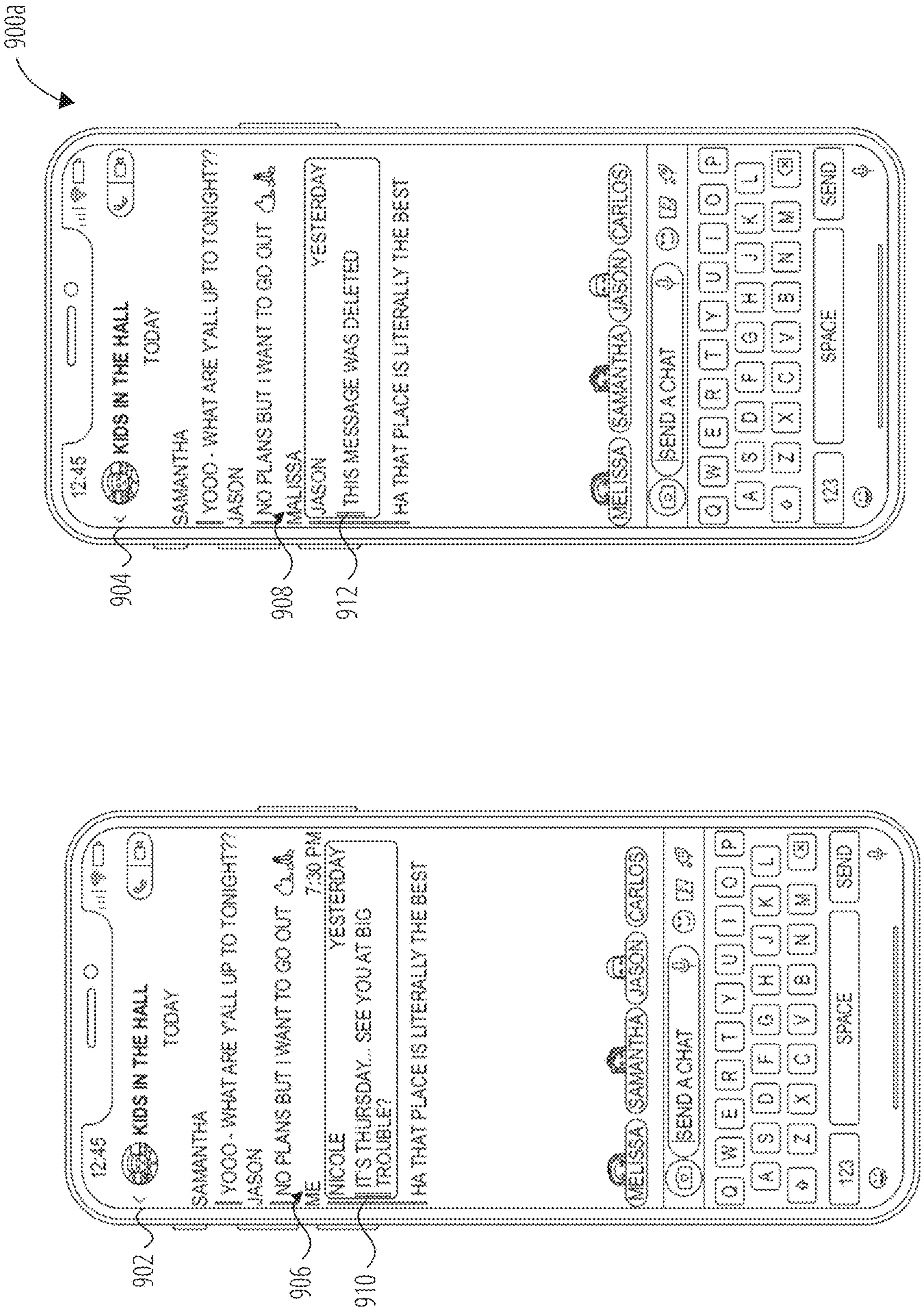
FIG. 9A is an interface diagram depicting interfaces presented by a contextual reply system, in accordance with one embodiment.

FIG. 9A is an interface diagram 900*a* depicting interfaces presented by a contextual reply system 214, in accordance with one embodiment.

As seen in the interface 902, the contextual reply system 214 may present a quoted reply 906, wherein the quoted reply 906 includes a display of a selected message 910. Accordingly to certain embodiments, the contextual reply system 214 may present the selected message 910 with a sender identifier (i.e., "Nicole") associated with a sender of the selected message 910.

In some embodiments, as depicted in the interface 904, a quoted reply 908 may include a display of a message status indicator 912, wherein the message status indicator 912 may indicate that a selected message was deleted or expired. Accordingly, upon determining that a selected message associated with a quoted reply has expired or was deleted, the contextual reply system 214 may present a message status indicator, such as the message status indicator 912 within the quoted reply 908.

Figure 9B:
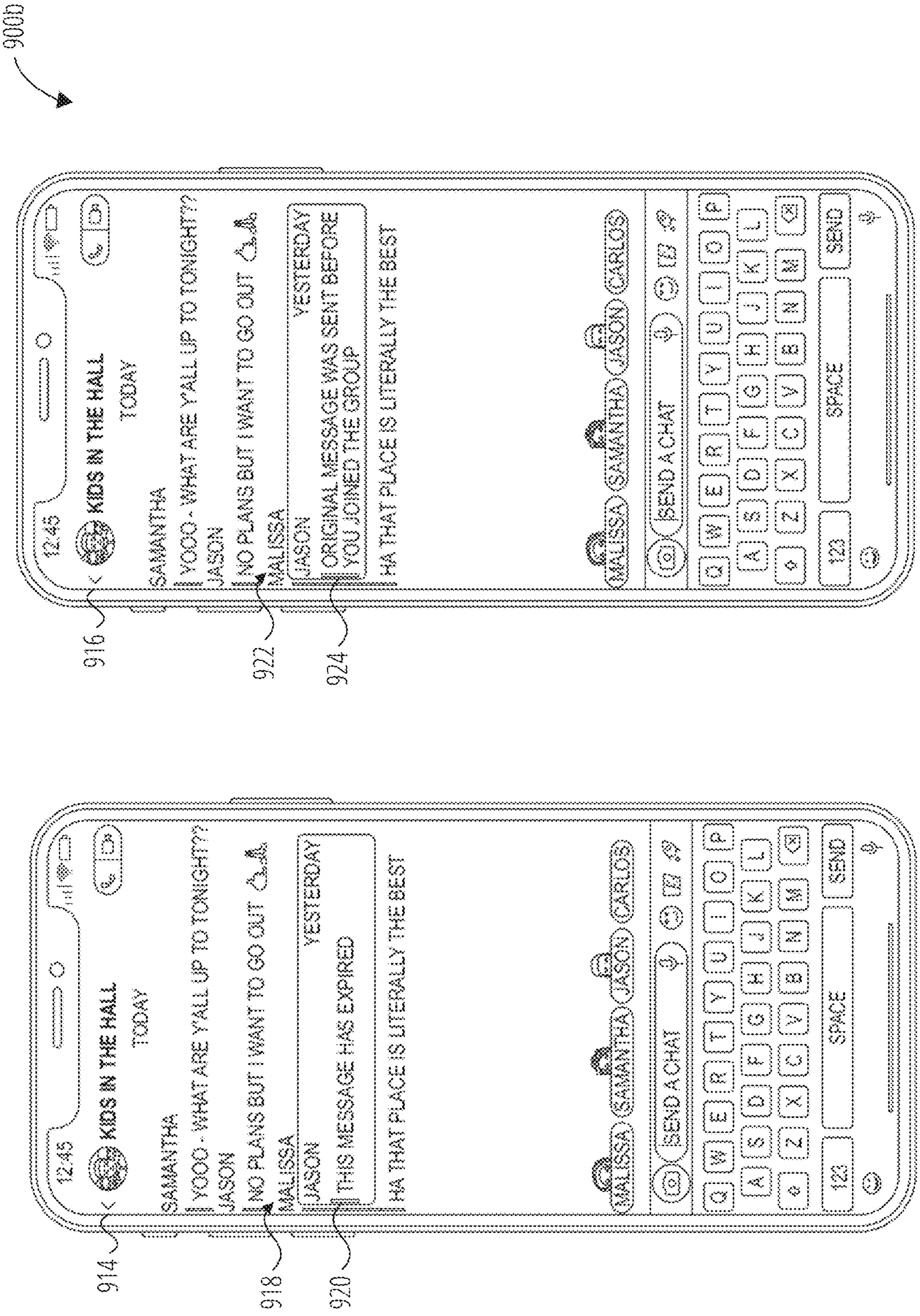
FIG. 9B is an interface diagram depicting interfaces presented by a contextual reply system, in accordance with one embodiment.

FIG. 9B is an interface diagram 900*b* depicted interfaces presented by a contextual reply system 214, in accordance with one embodiments.

As seen in the interface 914, the contextual reply system 214 may present a quoted reply 918, wherein the quoted reply 918 includes a display a selected message. According to certain embodiments, upon determining that the selected message has expired, such as due to a display duration associated with the selected message, the contextual reply system 214 may present the message status indicator 920. In some embodiments, the message status indicator 920 may include an indication of a sender of the message (i.e., "Jason"), as well as temporal information associated with the message (i.e., "yesterday").

Similarly, as depicted in the interface 916, the quoted reply 922 may provide an indication of a message status, such as the message status indicator 924, wherein the message status indicator 924 provides an indication that a message associated with a quoted reply 922 was sent prior to a user of the client device 106 joining a communication session.

Machine Architecture

Figure 10:
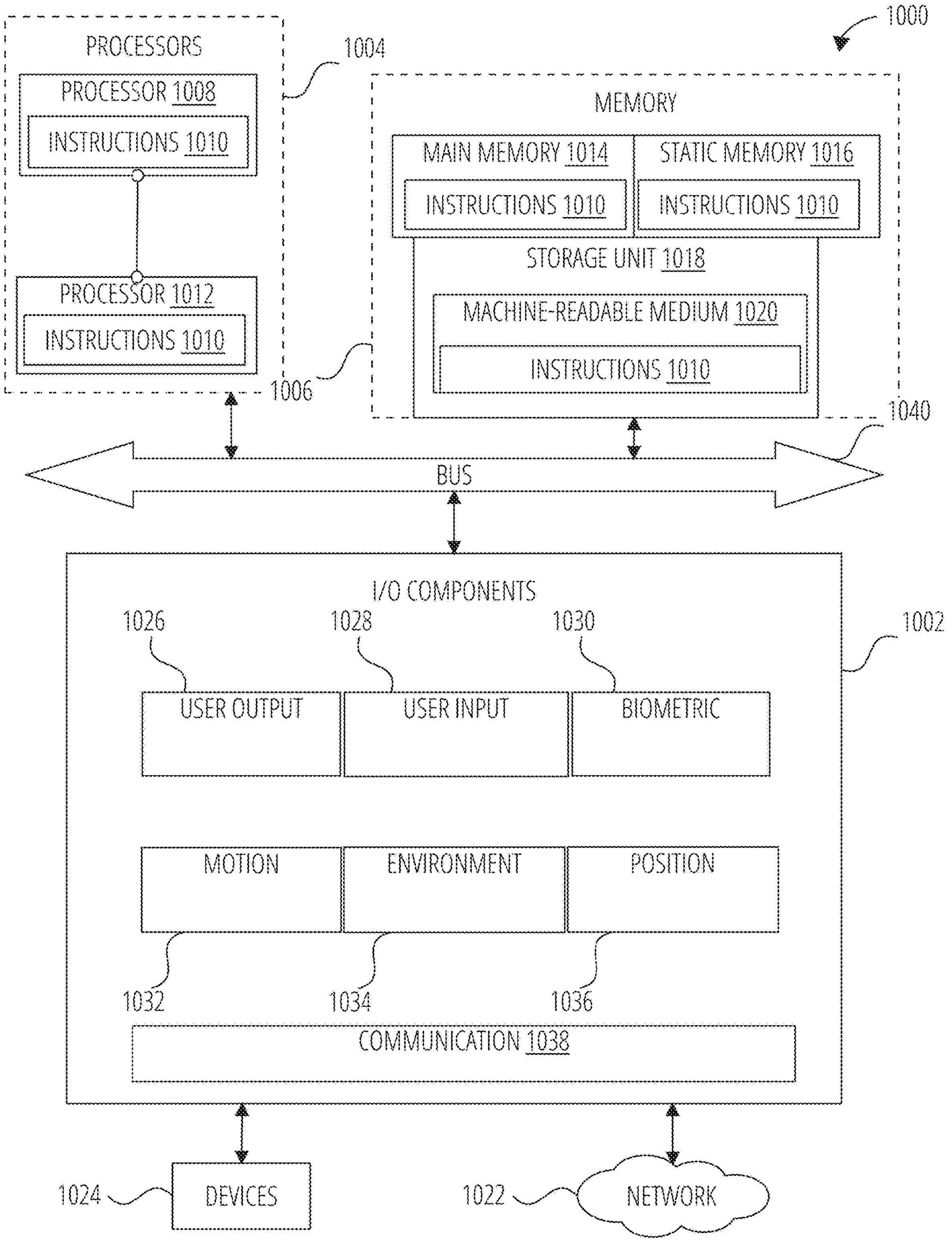
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the client device 106 or any one of a number of server devices forming part of the messaging server system 104. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 638, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the Processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface Component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Software Architecture

Figure 11:
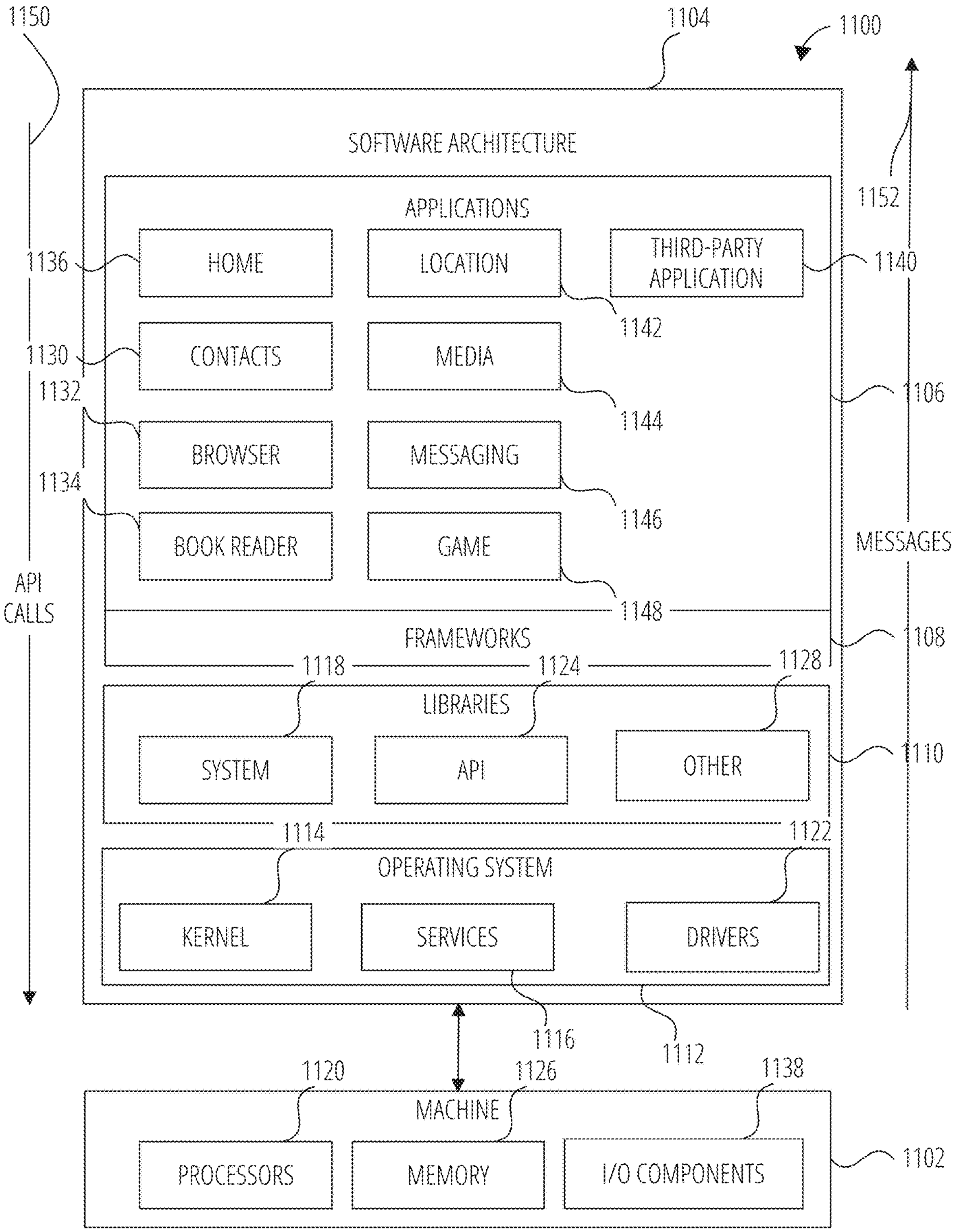
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Processing Components

Figure 12:
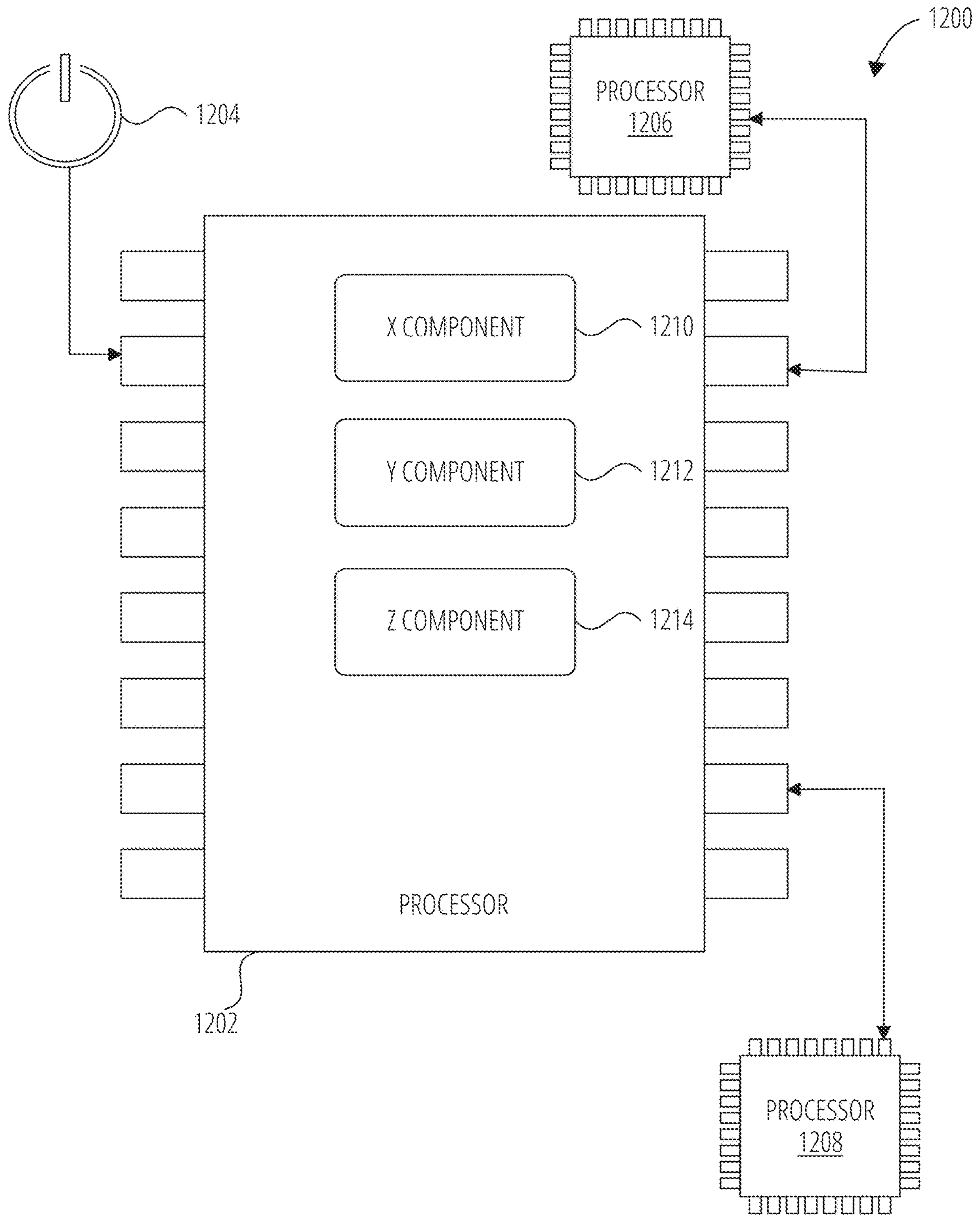
FIG. 12 is a diagrammatic representation of a processing environment, in accordance with some examples.

Turning now to FIG. 12, there is shown a diagrammatic representation of a processing environment 1200, which includes a processor 1202, a processor 1206, and a processor 1208 (e.g., a GPU, CPU or combination thereof).

The processor 1202 is shown to be coupled to a power source 1204, and to include (either permanently configured or temporarily instantiated) modules, namely an X component 1210, a Y component 1212, and a Z component 1214. The X component 1210 operationally displays a messaging interface that comprises a plurality of messages, the Y component 1212 operationally receives inputs to select a message from among the plurality of messages, and the Z component 1214 operationally generates and presents quoted replies. As illustrated, the processor 1202 is communicatively coupled to both the processor 1206 and the processor 1208.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporancously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:

causing display of a messaging interface at a client device associated with a user account, the messaging interface comprising a plurality of messages;

receiving an input that selects a message from among the plurality of messages, the message corresponding with a sender identifier;

causing display of a menu element at a position within the messaging interface responsive to the input that selects the message, the menu element comprising a visual presentation of the message at a position within the menu element, the visual presentation of the message including the sender identifier and contextual information that comprises a timestamp, and a set of composition options;

receiving a selection of a composition option from among the set of composition options;

causing display of a text input field based on the selection of the composition option, the text input field comprising a presentation of the message that includes the sender identifier;

receiving a text input via the text input field; and causing display of a quoted reply within the messaging interface, the quoted reply comprising at least the text input, the message, the sender identifier, and a user identifier associated with the user account.

2. The method of claim 1, wherein the sender identifier comprises a graphical property that includes a color, and wherein the text input field includes the color of the sender identifier.

3. The method of claim 1, wherein the input comprises an input attribute, and the causing display of the menu element responsive to the input that selects the message further comprises:

causing display of the menu element based on the input attribute of the input.

4. The method of claim 3, wherein the input attribute comprises one or more of:

an input pressure;

an input duration; and an input gesture.

5. The method of claim 1, wherein the input is a first input, the message corresponds with a position among a sequence of messages that comprise the plurality of messages, and wherein the method further comprises:

receiving a second input that selects the quoted reply within the messaging interface; and presenting the plurality of messages within the messaging interface based on the position of the message.

6. The method of claim 1, wherein the message comprises an ephemeral message.

7. The method of claim 1, wherein the input is a first input, the text input field further comprises a presentation of a set of reaction icons, and wherein the method further comprises:

receiving a second input that selects a reaction icon from among the set of reaction icons; and causing display of the quoted reply within the messaging interface, the quoted reply comprising the text input, the message, the sender identifier, the user identifier associated with the user account, and the reaction icon.

8. A system comprising:

a memory; and at least one hardware processor coupled to the memory and comprising instructions that causes the system to perform operations comprising:

causing display of a messaging interface at a client device associated with a user account, the messaging interface comprising a plurality of messages;

receiving an input that selects a message from among the plurality of messages, the message corresponding with a sender identifier;

causing display of a menu element at a position within the messaging interface responsive to the input that selects the message, the menu element comprising a visual presentation of the message at a position within the menu element, the visual presentation of the message including the sender identifier and contextual information that comprises a timestamp, and a set of composition options;

receiving a selection of a composition option from among the set of composition options;

causing display of a text input field based on the selection of the composition option, the text input field comprising a presentation of the message that includes the sender identifier;

receiving a text input via the text input field; and causing display of a quoted reply within the messaging interface, the quoted reply comprising at least the text input, the message, the sender identifier, and a user identifier associated with the user account.

9. The system of claim 8, wherein the sender identifier comprises a graphical property that includes a color, and wherein the text input field includes the color of the sender identifier.

10. The system of claim 8, wherein the input comprises an input attribute, and the causing display of the menu element responsive to the input that selects the message further comprises:

causing display of the menu element based on the input attribute of the input.

11. The system of claim 10, wherein the input attribute comprises one or more of:

an input pressure;

an input duration; and an input gesture.

12. The system of claim 8, wherein the input is a first input, the message corresponds with a position among a sequence of messages that comprise the plurality of messages, and wherein the operations further comprise:

receiving a second input that selects the quoted reply within the messaging interface; and presenting the plurality of messages within the messaging interface based on the position of the message.

13. The system of claim 8, wherein the message comprises an ephemeral message.

14. The system of claim 8, wherein the input is a first input, the text input field further comprises a presentation of a set of reaction icons, and wherein the operations further comprise:

receiving a second input that selects a reaction icon from among the set of reaction icons; and causing display of the quoted reply within the messaging interface, the quoted reply comprising the text input, the message, the sender identifier, the user identifier associated with the user account, and the reaction icon.

15. A non-transitory machine-readable storage medium comprising instructions that, when executed by one or more processors of a machine, cause the machine to perform operations comprising:

causing display of a messaging interface at a client device associated with a user account, the messaging interface comprising a plurality of messages;

receiving an input that selects a message from among the plurality of messages, the message corresponding with a sender identifier;

causing display of a menu element at a position within the messaging interface responsive to the input that selects the message, the menu element comprising a visual presentation of the message at a position within the menu element, the visual presentation of the message including the sender identifier and contextual information that comprises a timestamp, and a set of composition options;

receiving a selection of a composition option from among the set of composition options;

causing display of a text input field based on the selection of the composition option, the text input field comprising a presentation of the message that includes the sender identifier;

receiving a text input via the text input field; and causing display of a quoted reply within the messaging interface, the quoted reply comprising at least the text input, the message, the sender identifier, and a user identifier associated with the user account.

16. The non-transitory machine-readable storage medium of claim 15, wherein the sender identifier comprises a graphical property that includes a color, and wherein the text input field includes the color of the sender identifier.

17. The non-transitory machine-readable storage medium of claim 15, wherein the input comprises an input attribute, and the causing display of the menu element responsive to the input that selects the message further comprises:

causing display of the menu element based on the input attribute of the input.

18. The non-transitory machine-readable storage medium of claim 17, wherein the input attribute comprises one or more of:

an input pressure;

an input duration; and an input gesture.

19. The non-transitory machine-readable storage medium of claim 15, wherein the input is a first input, the message corresponds with a position among a sequence of messages that comprise the plurality of messages, and wherein the operations further comprise:

receiving a second input that selects the quoted reply within the messaging interface; and presenting the plurality of messages within the messaging interface based on the position of the message.

20. The non-transitory machine-readable storage medium of claim 15, wherein the message comprises an ephemeral message.

* * * * *